US007456860B2

(12) United States Patent
Shimizu et al.

(10) Patent No.: US 7,456,860 B2
(45) Date of Patent: Nov. 25, 2008

(54) SURVEILLANCE SYSTEM USING PULSE-CODED RAYS

(75) Inventors: Hideo Shimizu, Iruma-gun (JP); Yukio Kobayashi, Iruma-gun (JP); Satoru Taguchi, Iruma-gun (JP)

(73) Assignee: U.S.K. Co., Ltd., Iruma-gun (JP)

( * ) Notice: Subject to any disclaimer, the term of this patent is extended or adjusted under 35 U.S.C. 154(b) by 774 days.

(21) Appl. No.: 10/950,645

(22) Filed: Sep. 28, 2004

(65) Prior Publication Data

US 2006/0072012 A1 Apr. 6, 2006

(51) Int. Cl.
*H04N 7/18* (2006.01)

(52) U.S. Cl. .......... 348/152

(58) Field of Classification Search .......... None
See application file for complete search history.

(56) References Cited

U.S. PATENT DOCUMENTS 4,829,442 A * 5/1989 Kadonoff et al. .......... 701/207
5,984,175 A * 11/1999 Popp .......... 235/375
7,233,745 B2 * 6/2007 Loechner .......... 398/128

FOREIGN PATENT DOCUMENTS

JP 06-315150 11/1994
JP 09-016865 1/1997

* cited by examiner

*Primary Examiner*—Nhon T Diep
(74) *Attorney, Agent, or Firm*—Oliff & Berridge, PLC

(57) ABSTRACT

Five infrared sensors are located in different height positions between respective main bodies 10A to 10H, and all of these infrared sensors transmit and receive 35 infrared rays pulse-coded in conformity with a start-stop system. In addition, these pulse-coded infrared rays have the signal width of, for example, 450 μs, and are serially transmitted with a predetermined delay time in a period of 20 ms by a delayed synchronizing-signal. Intrusion surveillance is performed by identifying the pulse codes of these infrared rays. According to this, since not only interference among a plurality of infrared sensors is prevented, but also infrared rays are outputted in a short time, the occurrence of false alarms etc. decreases remarkably.

10 Claims, 8 Drawing Sheets

SURVEILLANCE SYSTEM USING PULSE-CODED RAYS

BACKGROUND OF THE INVENTION

1. Field of the Invention

The present invention relates to a surveillance system, and in particular, to structure for detecting an intruder and an intruding object in a surveillance system which embeds a camera and continuously monitors an intruder and an intruding object day and night into a controlled area such as an airport or a power plant.

2. Description of the Related Art

Up to now, in controlled areas such as an airport, a power plant, and a special building and a facility, and ecology investigations of nature animals, the detection of an intruder and an intruding object, where an infrared sensor has been used, surveillance (observation) by camera photographing, analyses of images photographed with a camera, and the like have been performed. Then, the transmission and reception of an infrared ray is performed by a pulse count system, a modulation frequency switching-system, or the like in the above-mentioned infrared sensor.

FIG. 9 shows the structure of the above-mentioned pulse count system. In this pulse count system, nine types of signals (1P to 9P) where one to nine pulses are inserted respectively in a period of 20 ms as shown are formed. Then, these nine types of infrared pulses are used as transmission and reception signals for surveillance.

FIG. 10 shows structure at the time of installing six pole-like main bodies $Q_1$ to $Q_6$ in a surveillance area. In this case, three types of infrared signals 1P, 2P, and 3P are transmitted and received by infrared sensors (floodlighting elements and photodetector elements) located at three locations in a vertical direction between main bodies $Q_1$ and $Q_2$. Similarly, three types of infrared signals 4P, 5P, and 6P are transmitted and received between main bodies $Q_2$ and $Q_3$, and three types of infrared signals 7P, 8P, and 9P are done between main bodies $Q_4$ and $Q_5$. Then, in a photodetection side, types of signals are identified by counting numbers of pulses within 20 ms as shown in FIG. 9, and it is judged whether they are the infrared signals (1P to 9P) assigned to detecting locations. Existence of an intruder or an intruding object is detected by whether the corresponding infrared signal is received. That is, when the assigned infrared signal is unreceivable, it is judged that an intruder etc. exists.

In the above-mentioned, a reason why the infrared rays whose signals (pulse number) are different are used is to avoid the interference of the infrared signals which are transmitted and received. Namely, since each of the infrared rays which are transmitted and received has a certain amount of divergence and further the above-mentioned main bodies $Q_1$ to $Q_6$ are installed with having a space of nearly 100 m, an infrared ray Lg outputted from an upper floodlight element of the main body $Q_5$ of FIG. 10(A) is received with middle and lower photodetector elements of the main body $Q_6$. Then, even if it is the upper infrared ray signal, if infrared signals which are transmitted and received by the upper to lower infrared sensors are the same, it is misdetected as being the infrared rays from the middle and lower photodetector elements. Hence, the existence of an intruder $H_1$ is not detected, and therefore, an alarm failure (an alarm is not given in spite of an intruder entering) arises. However, as shown in FIG. 9, if the infrared rays (signals 4P to 6P) used in upper to lower steps are what can be identified, it is possible not only to avoid interference, but also to prevent the alarm failure.

Nevertheless, a conventional pulse count system has a problem that a false alarm (an alarm is given in spite of no intruder) and an alarm failure arises since a number of pulses which is counted is affected by sunlight which is extraneous light, direct projection of vehicle headlight etc., reflection of these extraneous light from an object, or reflection, wraparounds, and interference (noise) of infrared rays used for transmission and reception.

Namely, when an unnecessary pulse “a” is added by extraneous light etc. at the time of receiving an infrared ray of the signal 1P in FIG. 9, a received signal results in an infrared ray of the signal 2P. When a pulse “b” is removed under the influence of extraneous light etc. at the time of receiving an infrared ray of the signal 9P, a received signal results in the signal 8P. Hence, these lead to false alarms. In addition, when one or two of unnecessary pulses “a” are added when an infrared ray of the signal 4P floodlighted from the main body $Q_5$ in FIG. 10(A) is received by a signal 5P or 6P infrared photodetector unit of the main body $Q_6$, an alarm failure arises since the intruder $H_1$ is not detected.

In addition, since this kind of surveillance system includes the outside of a building as a surveillance area in many cases, infrared light intensity is set high so as to be able to perform infrared transmission and reception even when there is an environmental change such as rainfall or snowfall, or fogging. Hence, this causes a false alarm or alarm failure. For example, since infrared rays of the main body $Q_1$ in FIG. 10 also reach the main bodies $Q_3$ to $Q_6$ besides the main body $Q_2$, this causes a false alarm.

Furthermore, the conventional pulse count system identifies only nine types of signals, and in addition, the modulation frequency switching system identifies only four types of signals. Hence, there is a problem that it is not possible to perform effective detection since there are few identifiable signals. That is, as shown also in FIG. 10, since nine types of infrared rays of signals 1P to 9P are altogether assigned in a region of main bodies $Q_1$ to $Q_4$, the same pulse signals 1P to 6P are used in the main bodies $Q_4$ to $Q_6$. Accordingly, when an infrared ray of the signal 1P of the main body $Q_1$ reaches a photodetector unit of the main body $Q_5$ by a wraparound etc., this leads to an alarm failure.

Then, up to now, without floodlighting from a floodlighting element straightly to a photodetector element like an infrared ray Lg (optical axis) shown by a dotted line in FIG. 10(B), the optical axis is turned a little in across wise direction like an infrared ray Lg (optical axis) shown by a continuous line. However, even if an infrared optical axis is turned in this way, it becomes hard to prevent the influence to the other main bodies when the main bodies $Q_1$ to $Q_6$ are installed nonlinearly, or when being installed in the neighborhood of a building etc.

FIG. 11(A) shows the case that the main bodies $Q_1$ to $Q_6$ are installed nonlinearly, and in this case, since an infrared ray has the certain extent of divergence, the infrared rays of the signals 1P to 3P floodlighted from the main body $Q_1$ result in being received by the main body $Q_5$ (chain double-dashed line in the diagram). In addition, FIG. 11(B) shows the case that the main bodies $Q_1$ to $Q_6$ are annularly installed near buildings $B_1$ and $B_2$. In this case, infrared rays of the signals 4P to 6P floodlighted with divergence (and with an optical axis being turned) from the main body $Q_2$ are received by the main body $Q_6$ after being reflected on the building $B_1$. At the same time, infrared rays of the signals 7P to 9P floodlighted with divergence (and with an optical axis being turned) from the main body $Q_3$ are received by the main body $Q_1$ after being reflected on the buildings $B_1$ and $B_2$. Since becoming a cause of a false alarm or an alarm failure, this interference of infrared rays should be avoided.

Furthermore, up to now, since there are few types of identifiable infrared rays, only two to three infrared sensors are provided between main bodies. Hence, there may be the case that it is not possible to effectively detect an intruder $H_2$ who invades with crawling as shown between the main bodies $Q_4$ and $Q_5$ in FIG. 10(A).

The present invention is made in view of the above-described problems, and aims at providing a surveillance system which can decrease the occurrence of false alarms and alarm failures remarkably by removing the influence of extraneous light and noise as much as possible, and making it possible to set a large number of identifiable signals.

SUMMARY OF THE INVENTION

In order to achieve the above-described object, a surveillance system according to the present invention is characterized by comprising two or more pole-like main bodies installed in a surveillance area with an arbitrary space, a light transmission signal generation unit which generates a plurality of pulse code signals conforming to a start-stop system, a plurality of photosensors which transmit and receive a plurality of pulse-coded rays formed based on the pulse code signals from this light transmission signal generating unit in different positions between the two or more main bodies, a light transmission signal control unit which sets pulse codes, which are different from each other, in all the plurality of photosensors located between the two or more main bodies, a code identification unit which identifies pulse codes of rays received from outputs of these photosensors, and an alarm processing unit which performs alarm processing on intrusion surveillance based on an output of this code identification unit.

In this invention, it is preferable to serially transmit and receive a plurality of pulse-coded rays, transmitted and received between the two or more main bodies, with a predetermined delay time.

According to the above-mentioned structure, although a plurality of main bodies are located in order at the intervals of, for example, nearly 100 m, each pulse code is assigned to five (or more) photosensors (infrared sensors) located in different height (for example, 2 m) between these main bodies. When, for example, eight main bodies are installed, pulse codes different from each other are assigned to all of the 35 (=5×7) photosensors respectively. This pulse code signal is coded in conformity with the start-stop system, and, has the structure of locating, for example, three bit pulses (0 or 1) between a start bit pulse and a center bit pulse, and locating three bit pulses (0 or 1) between the above-mentioned center bit pulse and an end (stop) bit pulse. According to this, it is possible to assign 49 pulse codes at the maximum.

In this way, it is possible to prevent interference, caused by using the same identifying signal in duplication, by using pulse codes, which are different, in all the photosensors respectively. In addition, since being outputted in a short time of 450 μs (it is preferable that it is 500 μs or less) within a period of, for example, 20 ms which is a detection period, a pulse coded ray in conformity with the start-stop system has an advantage that influence to the identification and judgment of a signal also becomes very small since a probability that extraneous light and noise enter in transmitted and received light in comparison with that of the former becomes small.

In addition, a plurality of pulse-coded rays transmitted and received between eight main bodies are transmitted and received serially with a predetermined delay time within the period of, for example, 20 ms by a delayed synchronizing-signal synchronizing with a phase of an AC line. Hence, it is possible to eliminate a malfunction of affecting detection because other light which is not an object of transmission and reception enters into a photosensor as an extraneous light noise.

Furthermore, by reporting that a photosensor is in a high-level environment when luminance to the photosensor becomes higher than a predetermined high level, and reporting that the photosensor is in a low level environment when becoming lower than a predetermined low level on the other hand, it is possible to prevent an output such as a false alarm caused by an environmental change.

BRIEF DESCRIPTION OF THE DRAWINGS

FIG. 3(A) is a side view and FIG. 3(B) is a top view;

FIG. 10(A) is a side view and FIG. 10(B) is a top view; FIG. 11(A) is a diagram at the time of locating the main bodies nonlinearly and FIG. 11(B) is a diagram at the time of locating the main bodies annularly.

DETAILED DESCRIPTION OF THE PREFERRED EMBODIMENTS

Figure 1:
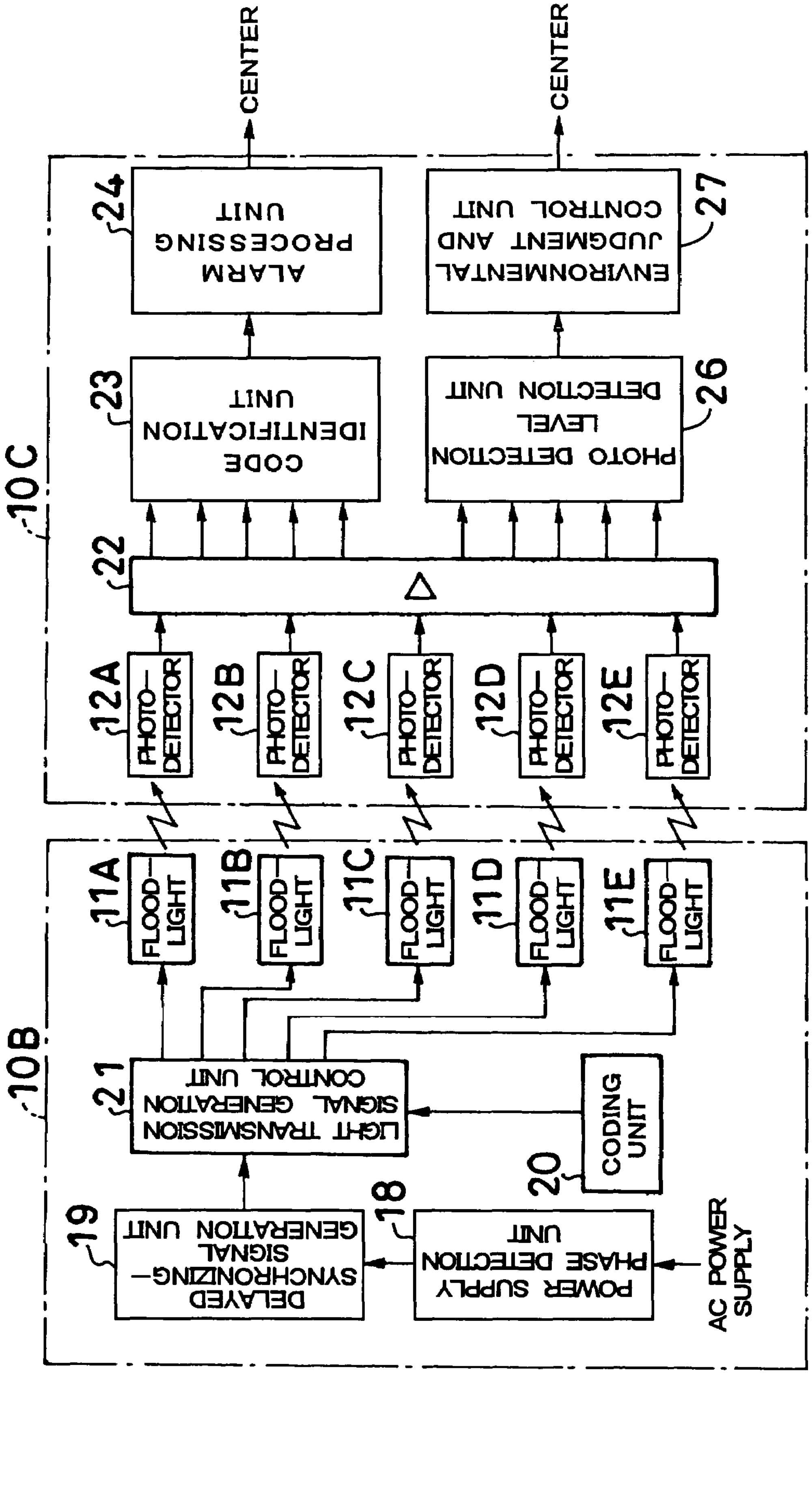
FIG. 1 is a circuit block diagram showing the main structure of a surveillance camera unit of an embodiment according to the present invention.
Figure 2:
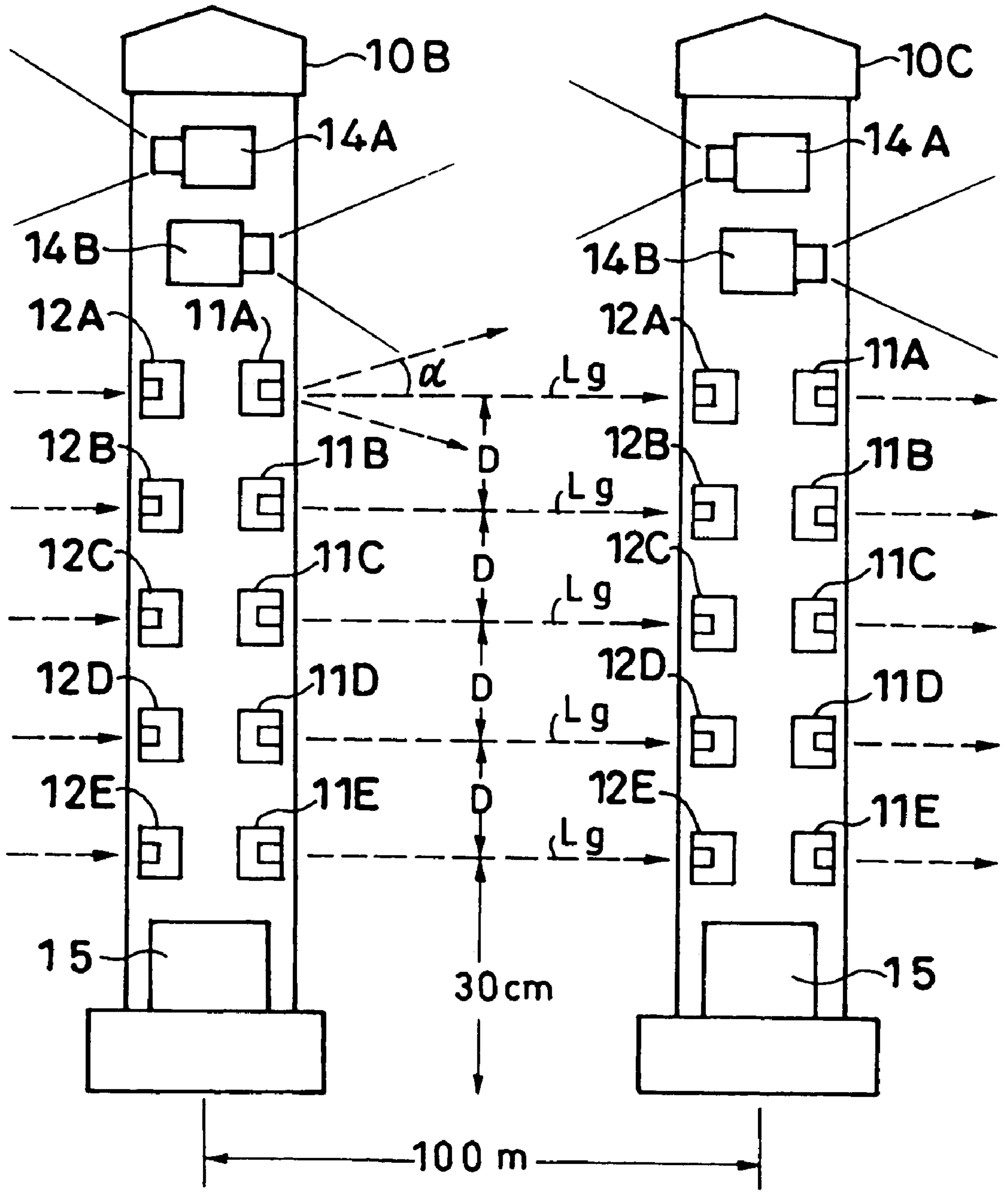
FIG. 2 is a diagram showing the structure within a main body of the embodiment.
Figure 3A:
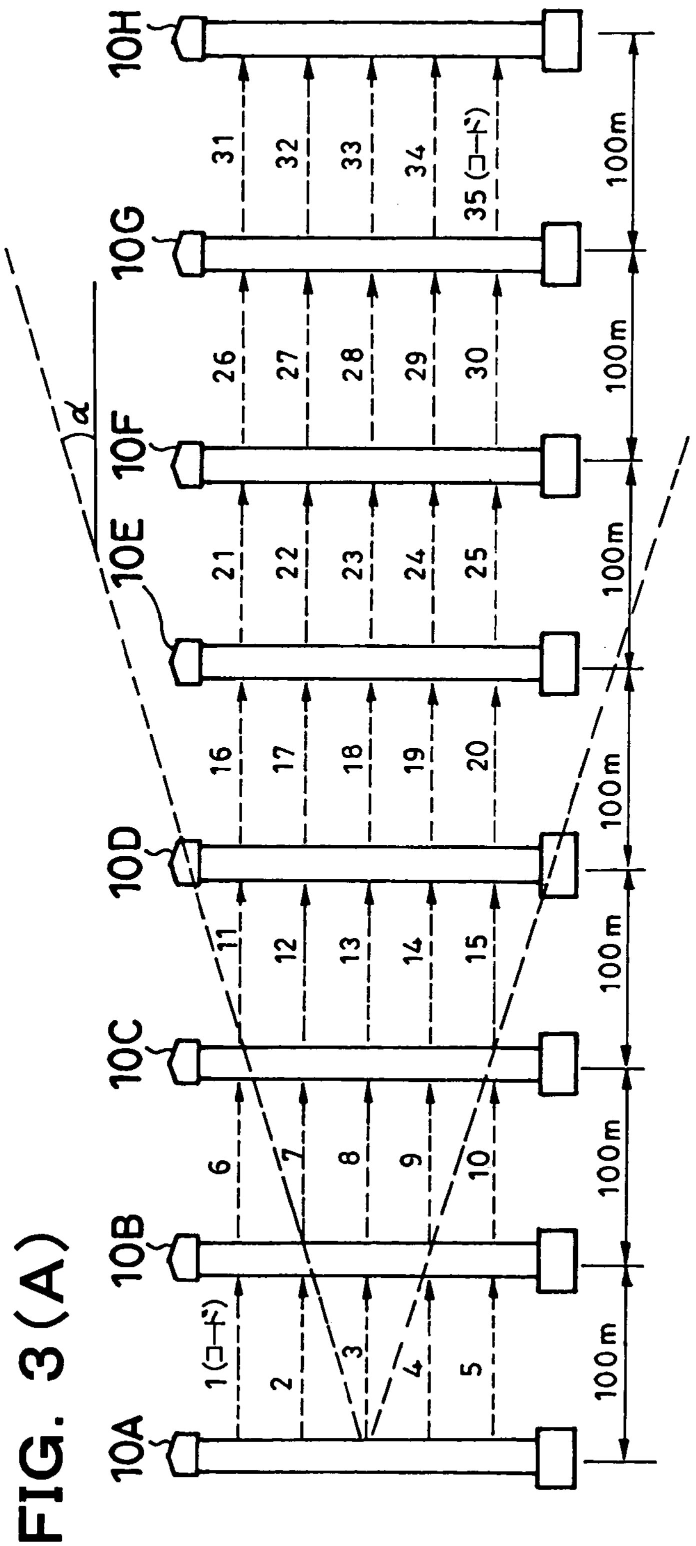
FIGS. 3(A) and 3(B) show the arrangement of the main body of the embodiment and pulse codes of infrared sensors.
Figure 3B:
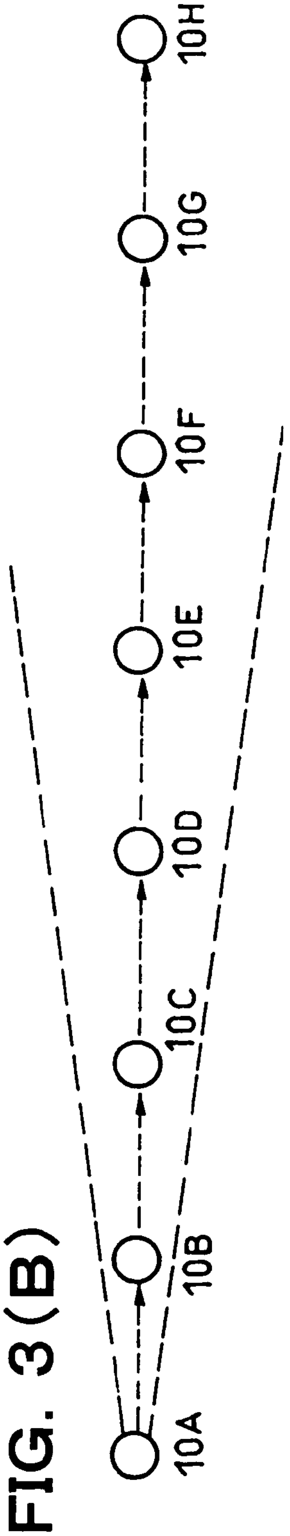
Figure 10A:
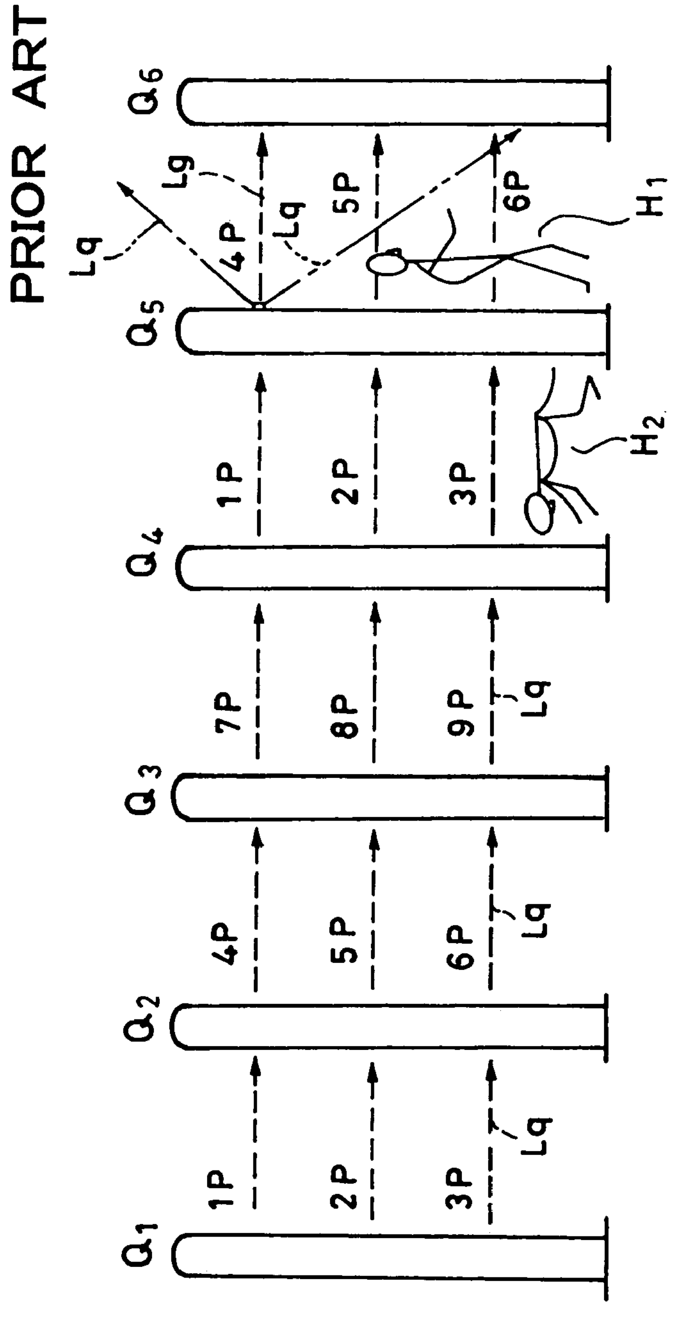
FIGS. 10(A) and 10(B) show a state of infrared transmission and reception in a conventional surveillance system.
Figure 10B:
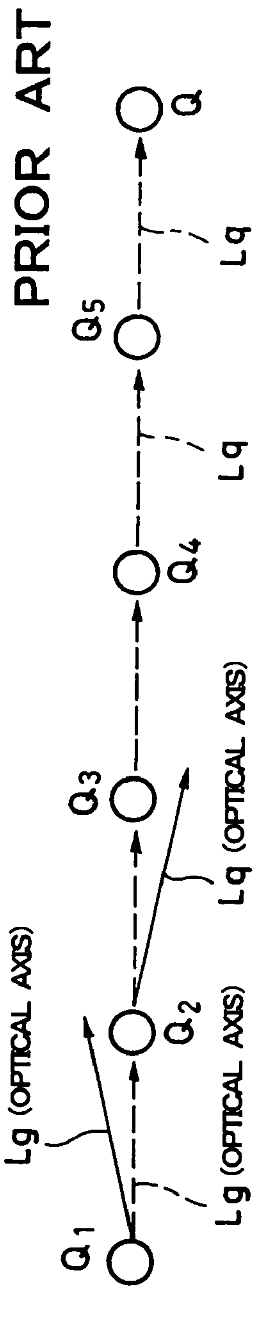

FIGS. 1 to 3 show the structure of the surveillance camera unit (or a complex surveillance camera unit) according to the embodiment, and in the example concerned, eight main bodies 10A to 10H are arranged and installed in a line at intervals of about 100 m (seven sections). As shown in FIG. 2, in each of the main bodies 10A to 10H (height 1.5 to 2 m), floodlighting units (floodlighting elements) 11A to 11E and photodetector units 12A to 12E (photodetector elements) are located in order at different height at each interval of D (30 cm to 50 cm) as, for example, five infrared sensors (five optical axes). The floodlighting unit 11E and photodetector unit 12E at lowest steps are located at the height of 30 cm from a ground surface. Thereby, it is possible to sufficiently detect an intruder ($H_2$ in FIG. 10(A)) who crawls and invades. In addition, in the main bodies 10A and 10E in end portions at the time of not being located annularly, it is sufficient to locate only one set of the above-mentioned floodlighting units 11A to 11E or photodetector units 12A to 12E.

In the above-mentioned floodlighting units 11A to 11E and photodetector units 12A to 12E, their optical axis area is made nearly 80ϕ, and infrared rays are emitted from the floodlighting units 11A to 11E at a divergence angle of "α" (1.5° to 3°). The infrared rays in the embodiment reach to 600 to 700 m. In addition, as shown in FIG. 2, surveillance cameras (an infrared camera or light camera) 14A and 14B are provided in the example concerned. These cameras 14A and 14B photograph a surveillance area, and an image of the surveillance area photographed with these cameras 14A and 14B is used not only for specifying an intruder and an intruding object which are set as objects of alarms, but also for image analysis for grasping the state, where there is no need of giving an alarm, such as the intrusion of animals, such as a crow, a dog, and a bear, and a natural object etc. Then, control circuit units 15 are provided in these main bodies 10A to 10H respectively.

FIG. 1 shows the circuit configuration of the control circuit unit 15 containing the above-mentioned floodlighting units 11A to 11E and photodetector units 12A to 12E, and in this FIG. 1, the structure of floodlighting is explained in the main body 10B and the structure of photodetection is explained in the main body 10C. First, the main body 10B comprises a power supply phase detection unit 18 which inputs AC power (commercial power), and detects a phase of an AC line, a delayed synchronizing-signal generation unit 19 which generates a plurality of delayed synchronizing-signals which synchronize with this AC line phase, a coding unit 20 which forms 35 pulse code signals in conformity with the start-stop system, and a light transmission signal generation control unit 21 which generates 35 coded-light transmission signals serially (time-sharing) on the basis of the above-mentioned delayed synchronizing-signals, and an output from this light transmission signal generation control unit 21 is supplied to the above-mentioned floodlighting units 11A to 11E.

In addition, the main body 10C comprises the photodetector units 12A to 12E, a code identification unit 23 which identifies each photodetection signal inputted through an amplifier 22 in each identification unit, and an alarm processing unit 24, and this code identification unit 23 identifies and judges whether a signal outputted from each of the above-mentioned photodetector units 12A to 12E is a pulse code assigned to each of the infrared sensors.

The above-mentioned alarm processing unit 24 judges whether the infrared rays floodlighted from the floodlighting units 11A to 11E of the main body 10B are photodetected, on the basis of the output of the above-mentioned code identification unit 23, and supplies an alarm output to a center when infrared rays are not photodetected in a predetermined condition. In addition, it is also possible to concurrently analyze images photographed with the above-mentioned cameras 14A and 14B and to output an alarm from both of this image analysis result and the infrared photodetection result in the above-mentioned alarm processing unit 24.

Moreover, a photodetection level detection unit 26 which inputs an output of the above-mentioned amplifier 22 and detects a photodetection level (extraneous light luminance) within a time unit, and an environmental judgment and control unit 27 which judges a High (level) environment and a Low (level) environment are further provided. Namely, this environmental judgment and control unit 27 outputs that it is the High environment, when detecting the luminance more than 6000 lux in the case of sunlight, and outputs that it is the Low environment, when detecting the luminance becoming 8% or less of the infrared light amount floodlighted.

This embodiment has the above structure, and in this surveillance system, as shown in the general drawing of FIG. 3, 35 pulse codes (1 to 35) are assigned to 35 infrared sensors in seven surveillance areas in the assignment of codes 1 to 5 to five infrared sensors between the main bodies 10A and 10B, codes 6 to 10 between the main bodies 10B and 10C, codes 11 to 15 between the main bodies 10C and 10D, and the like in the main bodies 10A to 10H linearly installed at intervals of nearly 100 m.

Figure 4:
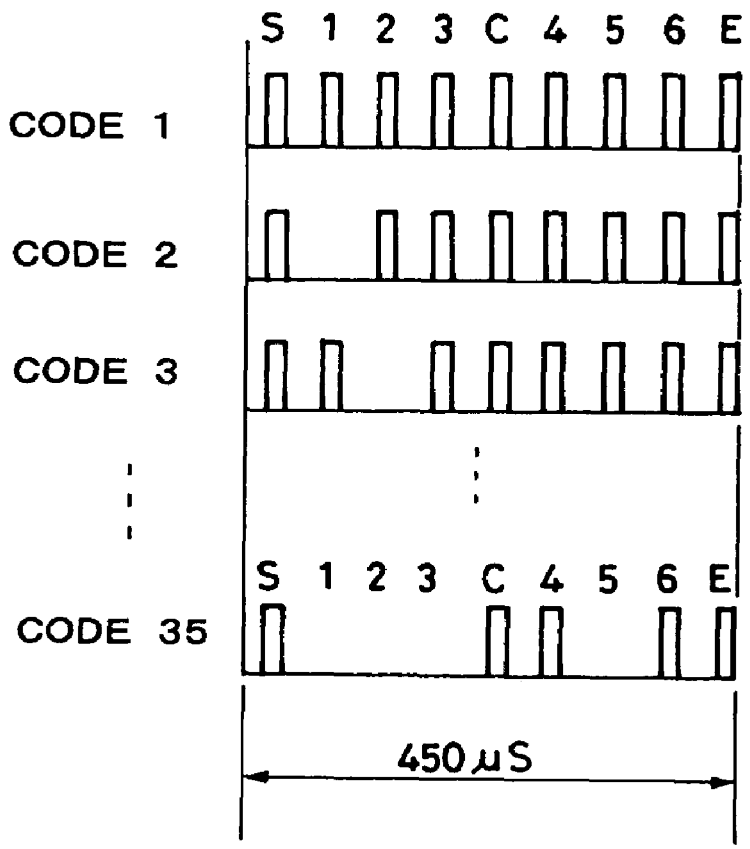
FIG. 4 is an explanatory diagram of pulse codes used in the embodiment.

FIG. 4 shows the structure of the above-mentioned thirty-five pulse codes, and these pulse codes are formed in conformity of the start-stop system. Each of these codes has a start bit pulse (S), a center bit pulse (C), and an end (stop) bit pulse (E), and further has three bit pulses (0 or 1) located between these respectively (first to third, and fourth to sixth) in a period of 450 μs. As illustrated, the above-mentioned coding unit 20 forms 35 pulse code signals such as code 1 that all of the first to sixth bits are ones, code 2 that a first bit is zero and the remainder bits are ones, and code 3 that a second bit is zero and the remainder bits are ones.

Then, these 35 pulse codes are assigned so as to become pulse codes of transmitted and received light which differ among all the infrared sensors (11A to 11E, and 12A to 12E). Owing to this, it is possible to prevent the interference of infrared signals in comparison with the case of transmitting and receiving infrared rays in the same code.

Figure 5:
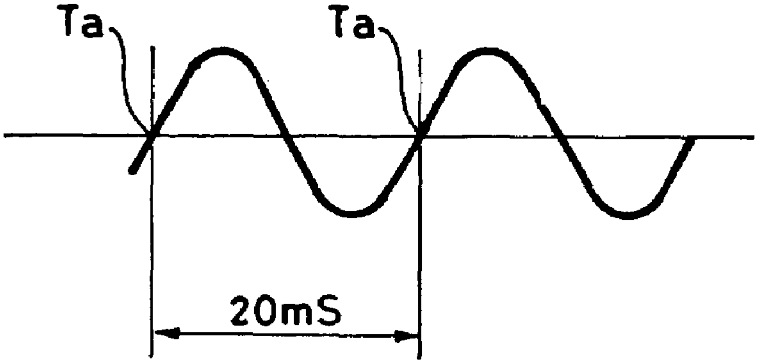
FIG. 5 is a graph showing an AC waveform for delayed synchronization used in the embodiment.
Figure 6:
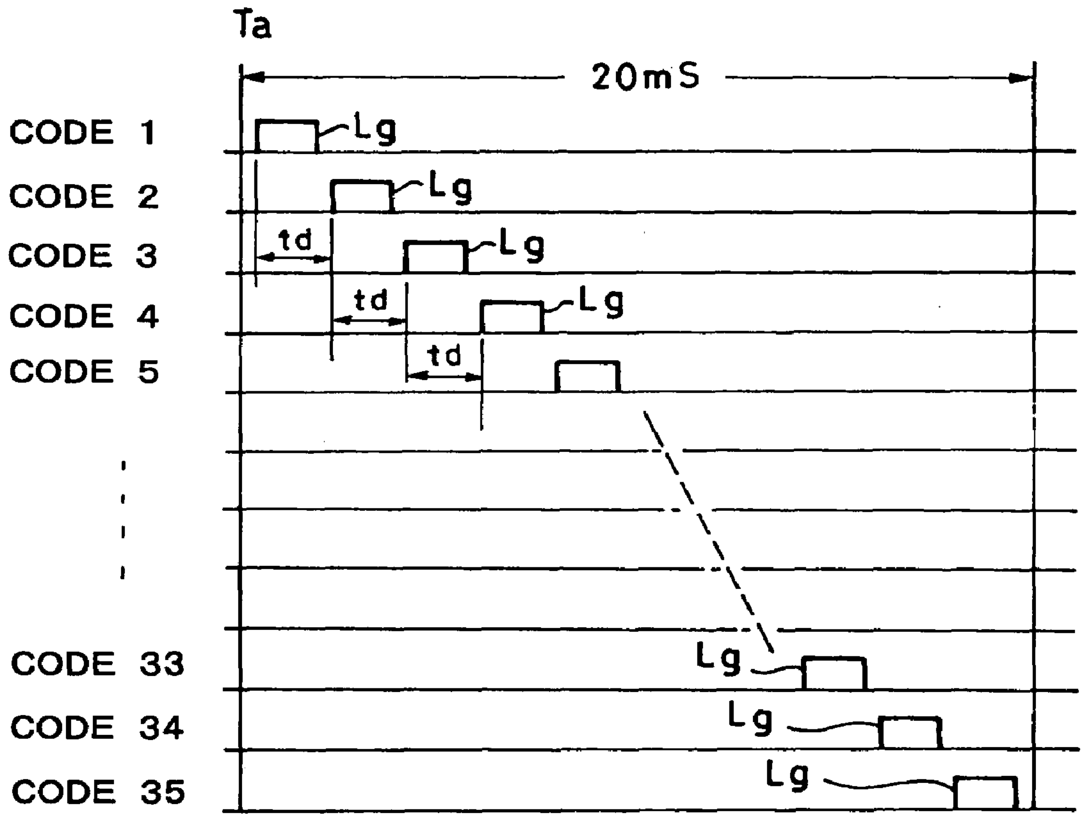
FIG. 6 is a chart showing the floodlighting timing of each pulse-coded infrared ray which is given the delayed synchronization in the embodiment.

FIG. 5 shows an AC waveform detected by the power supply phase detection unit, and FIG. 6 shows floodlighting states of infrared rays which are given the delayed synchronization. Since the same commercial power is supplied to the main bodies 10A to 10H in FIG. 3, an AC waveform one cycle of which becomes a period of 20 ms appears in the power supply phase detection unit 18 of each of the main bodies 10A to 10H in the case of a frequency of 50 Hz as shown in FIG. 5. Then, a point Ta whose electric potential is zero at a rise time of such an AC waveform is detected, and the delayed synchronizing-signal generation unit 19 forms a delayed synchronizing-signal delayed by delay time (td in FIG. 6) with this point Ta as a starting point. This delayed synchronizing-signal is supplied to the light transmission signal generation control unit 21. This light transmission signal generation control unit 21 gives 35 pulse code signals to the floodlighting units 11A to 11E in the timing of the above-mentioned delayed synchronizing-signal. Hence, as shown in FIG. 3, the infrared rays Lg coded by the pulse codes 1 to 35 are floodlighted in order serially in the timing of the delay time td.

Figure 7:
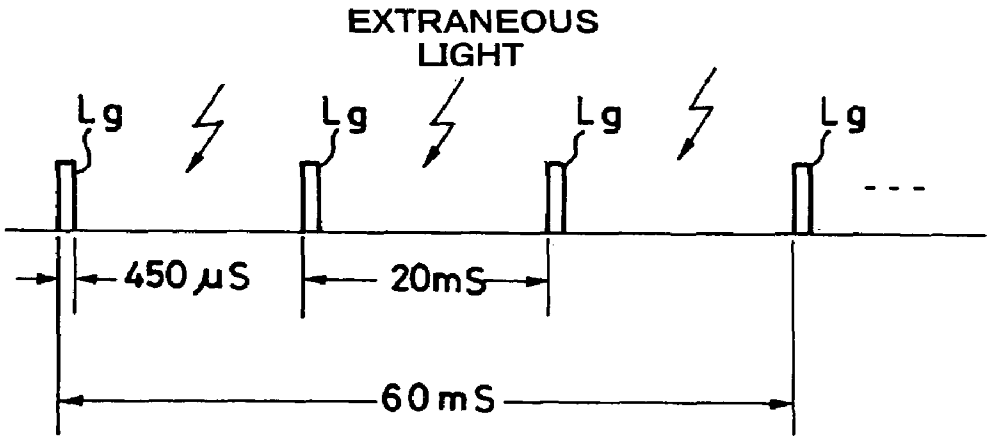
FIG. 7 is a chart showing a floodlighting state of an infrared ray outputted from one infrared sensor of the embodiment.
Figure 9:
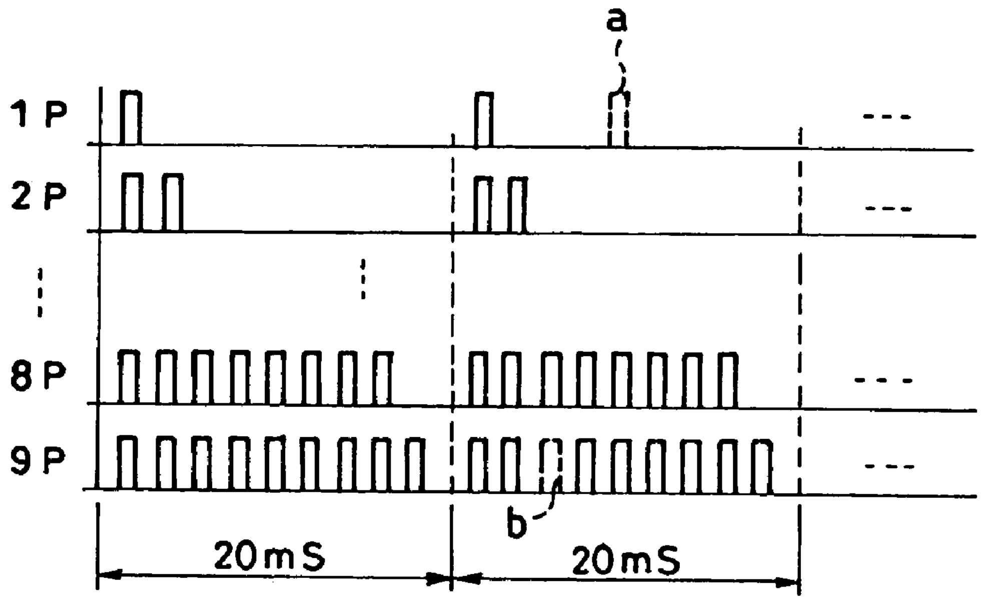
FIG. 9 is a chart showing the pulse structure used in a conventional pulse count system.

FIG. 7 shows the floodlighting state of an infrared ray in one infrared sensor (pulse coded) of this embodiment, and the pulse coded infrared ray constructed in the period of 450 μs as mentioned above is floodlighted from the floodlighting units 11A to 11E per 20 ms as shown. Accordingly, in comparison with the infrared rays in the conventional pulse count system shown in FIG. 9, the pulse coded infrared rays are outputted in an extremely short time of nearly 1/44. Hence, the influence of extraneous light, such as addition, lack, etc. of a pulse, to the infrared rays decreases, and hence, false alarms and alarm failures are decreased remarkably.

Then, the pulse code signals of the infrared rays photodetected by the photodetector units 12A to 12E are identified in the code identification unit 23, and thereafter, the alarm-processing unit 24 performs alarm processing. Nevertheless, in this embodiment, judgment for an alarm output to the center etc. is performed by three times of light reception and detection in a period of 60 ms. Namely, an alarm of an intruder entering is not outputted when a pulse code (codes 1 to 35) which corresponds is not detected by one or two times of infrared photodetection, but an alarm of an intruder entering is outputted when a pulse code which corresponds is not detected in all the three times. According to this, in comparison with the case that an alarm is outputted in one time of detection, the generation of false alarms and alarm failures is further decreased.

Figure 11A:
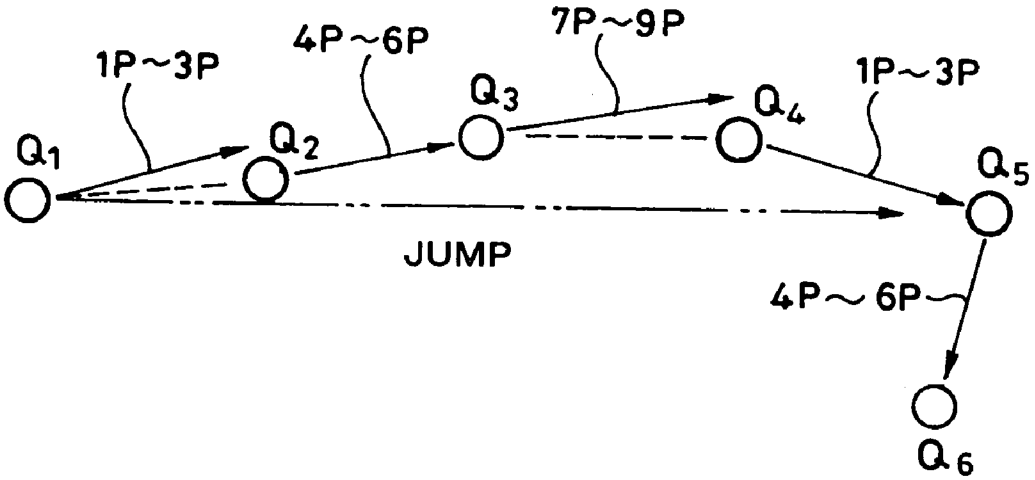
FIGS. 11(A) and 11(B) show a floodlighting state of infrared rays in the conventional surveillance system.
Figure 11B:
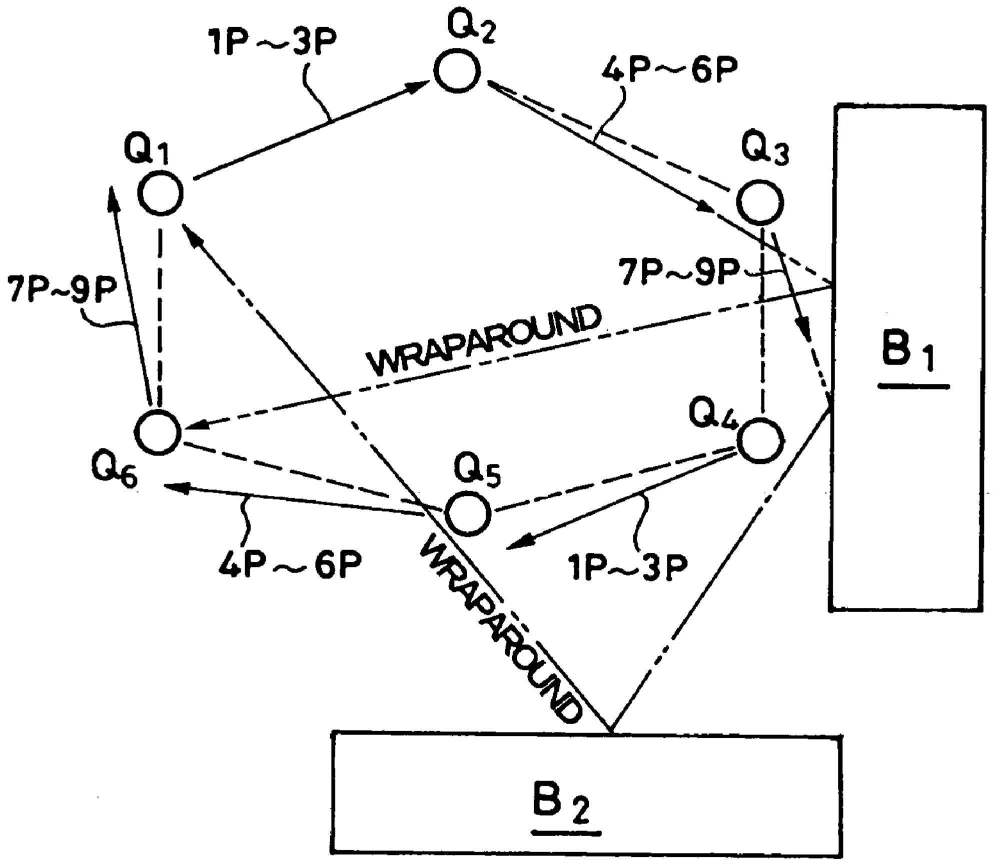

Furthermore, in this embodiment, as mentioned above, since the infrared rays Lg with pulse codes 1 to 35 are serially floodlighted continuously in the timing of the delay time td, there is an advantage that it is possible to favorably prevent the interference of infrared signals, in comparison with the case of transmitting and receiving light concurrently. That is, as explained in FIG. 11, with depending on an arrangement status of the main bodies 10A to 10H, or since an infrared ray of, for example, a code 3 is floodlighted with a divergence angle of 1.5° to 3° as also shown in FIG. 3, other photodetector units (12A to 12E) may be photodetected. When the transmission and reception of light is performed concurrently, infrared rays are photodetected in duplication, and hence, even if they are infrared rays with different pulse codes, incorrect identification of a pulse code may arise. This embodiment can securely prevent the occurrence of a false alarm and an alarm failure by eliminating such incorrect identification of a pulse code, even if the main bodies 10A to 10H are installed linearly, nonlinearly, or annularly.

In addition, the environmental judgment and control unit 27 mentioned above outputs the judgment result of the High environment or Low environment on the basis of a photodetection level detected by the photodetection level detection unit 26. That is, in this embodiment, when an input of extraneous light becomes at the luminance of 6000 lux or more in the morning sun, setting sun, etc. and the photodetection of a value corresponding to this luminance is detected, the environmental judgment and control unit 27 outputs to the center etc. that it is the High environment. In this center, indication etc. showing the High environment is performed. Accordingly, outputs such as a false alarm by environmental deterioration are prevented (since this High environment is the state that a pulse code cannot be read although there is light, an alarm is given).

Figure 8:
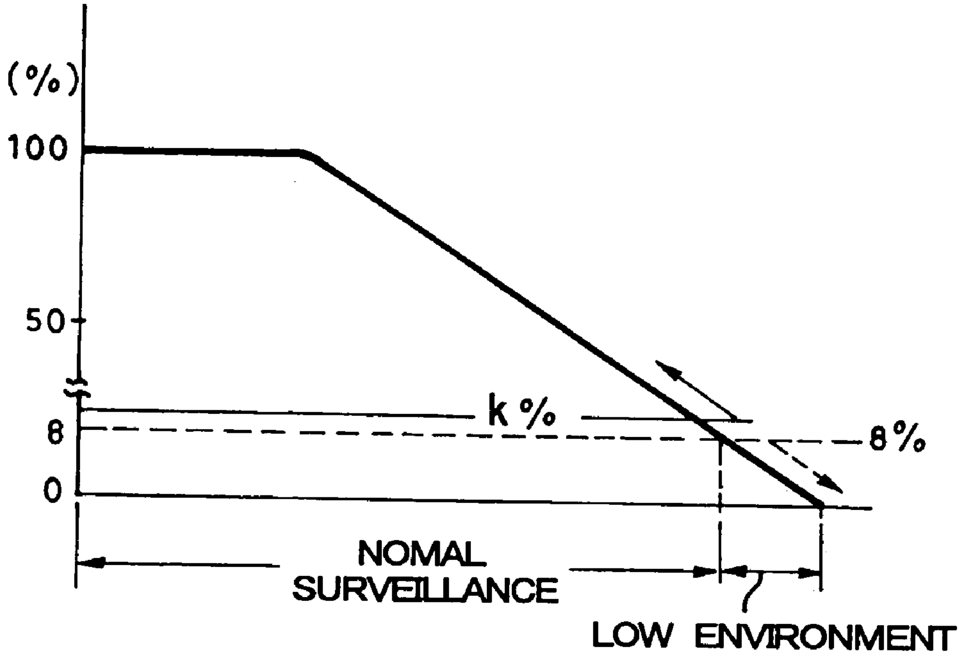
FIG. 8 is a graph for explaining the operation of a Low environmental output in the embodiment.

Furthermore, the environmental judgment unit 27 outputs that it is the Low environment, when a photodetection level detected by the above-mentioned photodetection level detection unit 26 becomes 8% or less to 100% of infrared light amount as shown in FIG. 8 and this state continues, for example, for 5 seconds or more, and continues the surveillance with the corresponding infrared sensor. Then, when k % or more of photodetection level which is a little higher than 8% continues, for example, for one minute or more, the environmental judgment unit 27 stops the Low environment output and the surveillance with the above-mentioned infrared sensor becomes normal surveillance. That is, when snow piles or vegetation etc. comes into a surveillance area temporarily, environmental deterioration is reported, and thereby, suitable correspondence (for example, snow removal, weeding out, etc.) becomes possible. In addition, when environmental deterioration further proceeds and a light amount becomes 0%, an alarm is once outputted. When the level of 0% continues beyond a setup time (for example, 5 seconds), the corresponding infrared sensor is stopped automatically. After that, when the environment is restored and the photodetection level stably continues, for example, for one minute or more, the infrared sensor is automatically returned. Thus, surveillance can be made easy.

In addition, in the above-mentioned embodiment, although the case that eight main bodies 10A to 10H are installed and five infrared sensors are located between respective main bodies is explained, these numbers can be set arbitrarily. Furthermore, although the delayed synchronizing-signal is generated on the basis of a phase of an ac line, this delayed synchronizing-signal may be also formed by using an oscillation circuit etc.

As explained above, according to this embodiment, since the interference of signals is prevented and rays are transmitted and received in a short time, the influence of extraneous light or noise becomes very small in comparison with the conventional, and hence, it becomes possible to decrease the occurrence of false alarms and alarm failures remarkably. In addition, since all pulse-coded rays are transmitted and received serially in delayed synchronization, it is possible to eliminate a malfunction that another ray which is not assigned enters into a photosensor to cause misdetection.

What is claimed is:

1. A surveillance system, comprising:

two or more pole-like main bodies installed in a surveillance area at arbitrary intervals;

a light transmission signal generation unit which generates a plurality of pulse code signals in conformity to a start-stop system;

a plurality of photosensors which transmit and receive a plurality of pulse-coded rays formed on the basis of the pulse code signals from this light transmission signal generation unit in different positions between the two or more main bodies;

a light transmission signal control unit which sets pulse codes, which are different from each other, in all the plurality of photosensors located between the two or more main bodies;

a code identification unit which identifies pulse codes of rays photodetected from outputs of these photosensors; and an alarm-processing unit which performs alarm processing on intrusion surveillance based on an output of this code identification unit;

wherein a plurality of pulse-coded rays, transmitted and received between the two or more main bodies, is serially transmitted and received with a predetermined delay time;

wherein signal width of the pulse-coded ray is set at 500 μs or less.

2. The surveillance system according to claim 1, wherein the surveillance system judges incident luminance of extraneous light from a photodetection state in the photosensor, and reports that it is in a high-level environment when this luminance becomes higher than a predetermined level.

3. The surveillance system according to claim 1, wherein the surveillance system judges incident luminance of extraneous light from a photodetection state in the photosensor, and reports that it is in a low-level environment when this luminance becomes lower than a predetermined level.

4. The surveillance system according to claim 1, wherein photosensors which horizontally transmit and receive light are located in five or more locations, whose height is different from each other, on each of the pole-like main bodies when their height is set at nearly 2 m.

5. The surveillance system according to claim 1, wherein the alarm processing unit gives an alarm of existence of an intruder when a pulse code is not detected three times or more by the same photosensor.

6. A surveillance system, comprising:

two or more pole-like main bodies installed in a surveillance area at arbitrary intervals;

a light transmission signal generation unit which generates a plurality of pulse code signals in conformity to a start-stop system;

a plurality of photosensors which transmit and receive a plurality of pulse-coded rays formed on the basis of the pulse code signals from this light transmission signal generation unit in different positions between the two or more main bodies;

a light transmission signal control unit which sets pulse codes, which are different from each other, in all the plurality of photosensors located between the two or more main bodies;

a code identification unit which identifies pulse codes of rays photodetected from outputs of these photosensors; and an alarm-processing unit which performs alarm processing on intrusion surveillance based on an output of this code identification unit;

wherein a plurality of pulse-coded rays, transmitted and received between the two or more main bodies, is serially transmitted and received with a predetermined delay time;

wherein the surveillance system detects a frequency of an AC line applied to the surveillance system and serially transmits and receives the pulse-coded rays with a predetermined delay time in timing set with this frequency of the AC line.

7. The surveillance system according to claim 6, wherein the surveillance system judges incident luminance of extraneous light from a photodetection state in the photosensor, and reports that it is in a high-level environment when this luminance becomes higher than a predetermined level.

8. The surveillance system according to claim 6, wherein the surveillance system judges incident luminance of extraneous light from a photodetection state in the photosensor, and reports that it is in a low-level environment when this luminance becomes lower than a predetermined level.

9. The surveillance system according to claim 6, wherein photosensors which horizontally transmit and receive light are located in five or more locations, whose height is different from each other, on each of the pole-like main bodies when their height is set at nearly 2 m.

10. The surveillance system according to claim 6, wherein the alarm processing unit gives an alarm of existence of an intruder when a pulse code is not detected three times or more by the same photosensor.

* * * * *